Patented Apr. 2, 1946

2,397,505

UNITED STATES PATENT OFFICE 2,397,505

CATALYTIC CRACKING AND CATALYST REACTIVATION

Roger W. Richardson, Baton Rouge, La., assignor to Standard Oil Development Company, a corporation of Delaware No Drawing. Application August 28, 1943, Serial No. 500,373

4 Claims. (Cl. 196—52)

This invention relates to the reactivation of clays employed for catalysts and pertains more particularly to the reactivation of activated clays employed in the catalytic cracking of hydrocarbon oils.

It is commonly known that certain types of clays, when activated by treatment with an inorganic acid, form active catalysts for cracking hydrocarbon oils. It is also generally known that synthetic gels comprising silica and alumina can be prepared which have a relatively higher order of activity than clays activated according to conventional methods. Because of the superiority of the synthetic catalytic materials, they can be used to advantage to produce high quality aviation gasoline and raw materials for synthetic rubber.

More recently it has been discovered that natural clays of the bentonite type, when subjected to drastic acid treatment employing upwards of from 50% of acid to one part of clay, followed by impregnation with 0.5 to 10% of $Al_2O_3$ or other active oxides, yield a catalyst having activity comparable to that of synthetic gels of silica and alumina. Furthermore, the products obtained from the cracking operation when employing the drastically treated and impregnated clay are comparable to those produced from synthetic gels. By "clays of the bentonite type" is meant those clays which are capable of activation by treatment with acid and which are commonly referred to in refining arts as bentonites.

All of the catalysts employed for the conversion of oils have been found to gradually depreciate as the cracking operation continues. It has been found that the loss in the activity of the drastically treated and impregnated clays resulting from continuous use of the catalyst in service may be partially or wholly restored by reactivating the catalyst with acid. It has also been found that, while modified clays prepared according to the new and improved procedure are responsive to reactivation with an acid, the synthetic silica-alumina gels, which in certain other respects are comparable to the modified clays, do not respond to any substantial extent to acid reactivation.

In accordance with the present invention, the activity of the modified clays may be maintained at a higher level or periodically restored by reactivation with an acid. In the continuous cracking process employing finely divided or granular catalytic material continuously circulating through a cracking and reactivating zone, the activity of the clay may be maintained at a higher level by continuously withdrawing a small proportion of said clay and subjecting it to reactivation before returning it to the cracking process.

In intermittent cracking processes in which a stationary mass or bed of catalyst is used, the cracking operation may be periodically interrupted at relatively infrequent intervals and the clay reactivated with an acid. The advantages gained in carrying out the process according to the present invention are illustrated in the following examples:

Example 1

A modified clay was prepared by treating a bentonite clay from Cheto County, Arizona, with 75% by weight of sulfuric acid of 12% concentration, washing, impregnating it with 5% $Al_2O_3$ (by decomposition of aluminum sulfate solution with ammonium hydroxide), washing and drying. This catalyst was tested to determine its cracking activity by passing an East Texas gas oil of 33.8° A. P. I. gravity in contact with the catalyst at a temperature of 850° F., a space velocity of 0.6 volume of liquid feed per volume of catalyst per hour over a two-hour period. The overhead vapors were condensed and redistilled. Upon redistillation, it was found that the product contained 52.0 volume percent of hydrocarbon constituents boiling below 400° F.

This catalyst was employed in a continuous cracking process wherein the catalyst in a finely divided state was successively circulated through cracking and regenerating zones until the activity of the catalyst had dropped so that when tested under the above conditions it produced only 40.0 volume percent of liquid constituents boiling below 400° F. Following this, the catalyst was treated with 37.5% of acid of 12.5% concentration at a temperature of about 200° F. for one-half hour. The reactivated catalyst, when tested under the above conditions, produced 46.0 percent gasoline boiling below 400° F. From the above it will be noted that the activity of the catalyst was materially improved by reactivating with the acid.

Example 2

A synthetic silica-alumina gel was formed by impregnating a purified silica hydrogel with an aluminum sulfate solution having a concentration capable of forming a catalyst having about 12% alumina. After impregnating the silica with the aluminum salts, the latter was decomposed to the hydroxide by ammonia. This product was washed, dried and activated at a temperature of 350° F. for several hours. This product, when tested under the above conditions, gave a gasoline yield of 56.0 volume percent boiling below 400° F. This product was employed continuously for cracking oils in a continuous unit until its activity had been reduced to such a point where it produced only 36.5% gasoline when tested under the above conditions. The partially deactivated gel was then treated in the same manner as the clay catalyst employed in Example 1, employing 37.5% acid by weight of the clay and for a period of 1½ hours. This product, when tested as above described, produced only 37.0% of gasoline boiling below 400° F.

From the above, it will be noted that the modified clay and the synthetic gel have substantially the same initial activity. However, the clay is responsive to acid reactivation, whereas the synthetic gel is not materially improved by such treatment.

I claim:

1. A process for the cracking of hydrocarbon oils which comprises passing the oil to be cracked in contact with a catalyst comprising bentonite clay activated by treatment with an acid, the amount of said acid being at least 50% by weight of the clay treated and followed by impregnating with an active metallic oxide, maintaining the oil in contact with the modified clay for a period sufficient to crack a substantial portion thereof into motor fuel, subjecting said catalyst to oxidation to remove carbonaceous deposits formed thereon during the cracking treatment and periodically subjecting said modified clay to further acid treatment to maintain the activity of said clay at a high level.

2. The process for cracking hydrocarbon oils, wherein the oil is cracked in the presence of a clay activated by treatment with at least 50% of its weight of an acid and impregnated with an active metallic oxide, wherein the catalyst is periodically regenerated to remove combustible products therein; the improvement in the method of maintaining the activity of said clay which comprises periodically subjecting said clay to further acid treatment.

3. The process defined in claim 2, wherein the clay is periodically treated with an acid in the amount equal to at least 25% of its weight.

4. The process defined by claim 2, wherein the active metallic oxide comprises from 0.5 to 10% alumina.

ROGER W. RICHARDSON.